United States Patent [19]
Lyons, Jr.

[11] Patent Number: 5,927,781
[45] Date of Patent: *Jul. 27, 1999

[54] STRAP APPARATUS FOR CARRYING RELATIVELY LARGE OBJECTS

[76] Inventor: Thomas F. Lyons, Jr., 6963 County Rd. D, Olney Springs, Colo. 81062

[*] Notice: This patent is subject to a terminal disclaimer.

[21] Appl. No.: 09/165,660

[22] Filed: Oct. 3, 1998

Related U.S. Application Data

[63] Continuation-in-part of application No. 08/890,629, Jul. 9, 1997, Pat. No. 5,833,292.

[51] Int. Cl.⁶ .................................................. B65D 63/18
[52] U.S. Cl. ............................................ 294/152; 294/157
[58] Field of Search ........................... 294/74, 137, 141, 294/149, 150, 152, 157, 165

[56] References Cited

U.S. PATENT DOCUMENTS

| | | | |
|---|---|---|---|
| 2,359,193 | 9/1944 | Bechik | 16/125 |
| 2,431,780 | 12/1947 | Theal | 294/74 |
| 3,214,072 | 10/1965 | Brown | 224/29 |
| 3,701,559 | 10/1972 | Marino et al. | 294/74 |
| 4,119,250 | 10/1978 | Brutlag | 224/49 |
| 4,431,226 | 2/1984 | Weilert | 294/150 |
| 4,521,045 | 6/1985 | Hart | 294/149 |
| 4,553,780 | 11/1985 | Strachan | 294/152 |
| 5,102,178 | 4/1992 | Staats, Jr. | 294/152 |
| 5,503,448 | 4/1996 | Dewey | 294/152 |

FOREIGN PATENT DOCUMENTS

| | | | |
|---|---|---|---|
| 406541 | 11/1924 | Germany | 294/149 |
| 2208641 | 4/1989 | United Kingdom | 294/74 |

*Primary Examiner*—Dean J. Kramer
*Attorney, Agent, or Firm*—Klaas, Law, O'Meara & Malkin, P.C.; Joseph J. Kelly

[57] ABSTRACT

At least three straps, each comprising a body portion and a buckle, are linked together to be used in carrying a relatively large object. The middle strap contacts the bottom surface of the relatively large object and the strap connected to each end of the middle strap contacts portions of the bottom surface and portions of relatively large opposite surfaces of the relatively large object. At least the end straps are adjustable to compensate for differences in the physical characteristics of the persons carrying the relatively large object. In another embodiment, the linked, looped straps are arranged so that one individual can readily carry a relatively large object or objects.

10 Claims, 2 Drawing Sheets

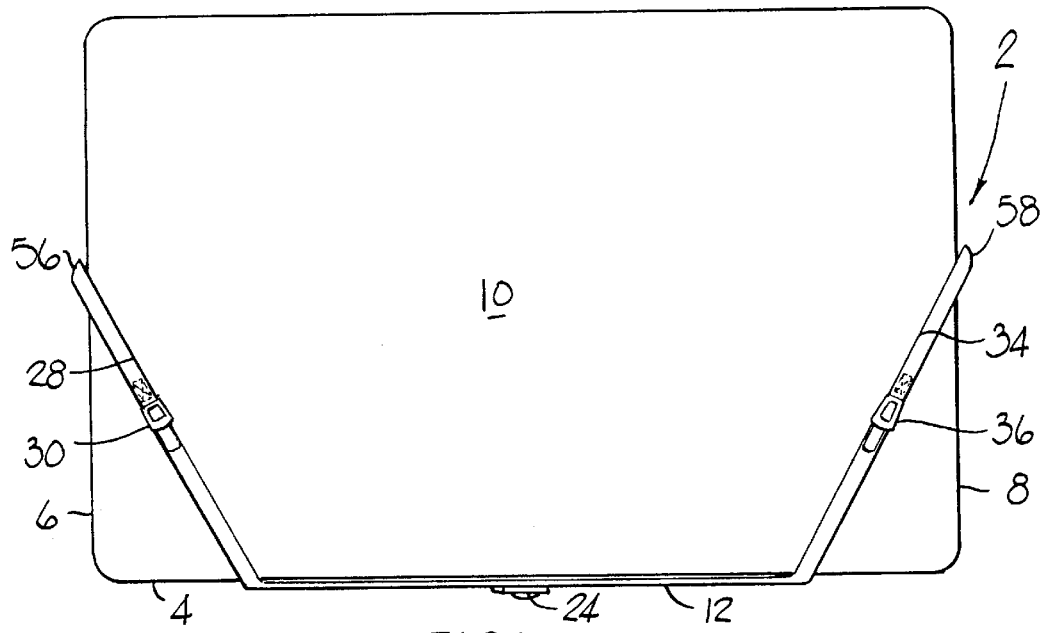
FIG. 1
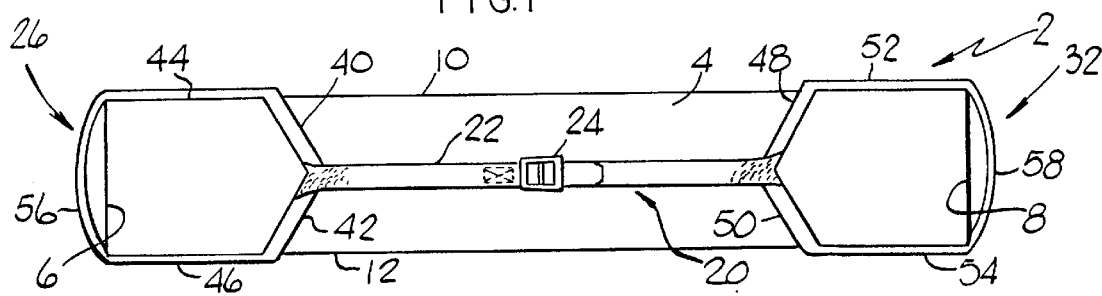
FIG. 2
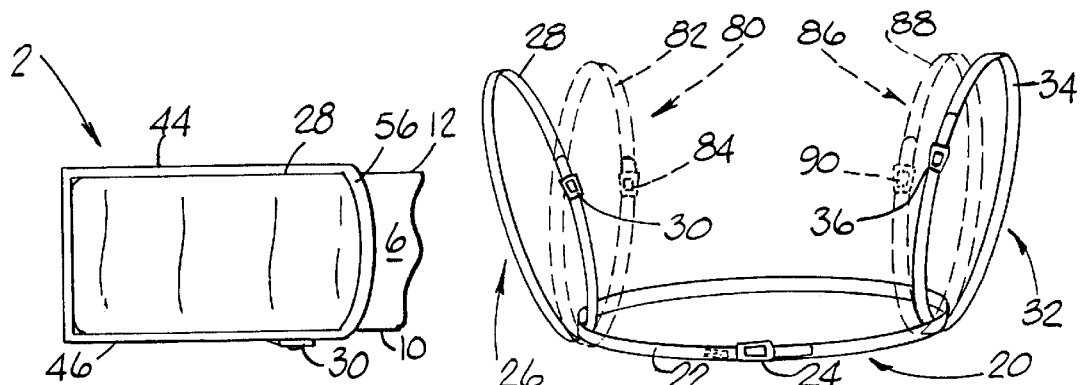
FIG. 3
FIG. 4
FIG. 5
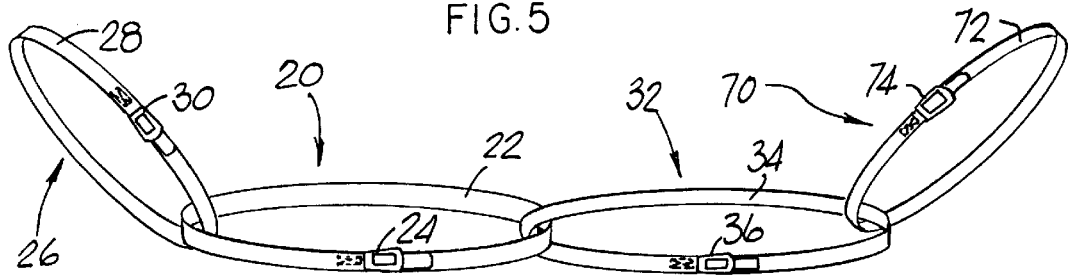

STRAP APPARATUS FOR CARRYING RELATIVELY LARGE OBJECTS

FIELD OF THE INVENTION

This application is a continuation-in-part application of U.S. patent application Ser. No. 08/890,629 filed Jul. 9, 1997 now U.S. Pat. No. 5,833,292 for Strap Apparatus For Carrying Relatively Large Objects by Thomas F. Lyons, Jr.

BACKGROUND OF THE INVENTION

There have been several types of apparatus marketed for use in carrying relatively large objects, such as a mattress. Some of these are described in U.S. patent application Nos. 3,214,072; 5,102,178 and 5,503,448. However, each of the apparatus disclosed in these patents have features that are not particularly desirable. For example, the apparatus in each of these patents is limited to a particular use and is not readily adaptable for other uses. When not used in accordance with this invention, the straps of this application can be used in a customary manner.

BRIEF DESCRIPTION OF THE INVENTION

This invention provides apparatus for carrying relatively large objects wherein the apparatus comprises conventional straps assembled together to function as an effective apparatus for the carrying of a relatively large object.

In a preferred embodiment of the invention, the apparatus comprises three straps each of which has a body portion and a buckle to cooperate in forming a looped strap when a portion of the body portion is connected to the buckle. After the first strap has been formed into a looped strap, the body portion of each of the other two straps is threaded through the looped first strap and connected to its buckle to form three linked looped straps then can be used to carry relatively large objects such as a mattress, mirror, glass table tops, plywood, sheetrock, water bed frames, pool tables and any other relatively large object that is heavy or cumbersome to carry. The relatively large object will have at least a bottom surface, opposite side surfaces and relatively large opposite surfaces. The three linked looped straps comprise a middle strap and two opposite end straps. In use, the middle strap is positioned to contact the bottom surface of the relatively large object. Each end strap is positioned so that portions thereof contact portions of the bottom surface and other portions thereof extend outwardly from each side of the bottom surface. The relatively large object is to be carried by two persons. The first person will grasp a portion of one end strap and lift it upwardly so that other portions of the one end strap will contact opposite portions of the relatively large opposite surfaces. The second person will grasp a portion of the other end strap and lift it upwardly so that portions of the other end strap will contact other opposite portions of the relatively large opposite surfaces. Each of the end straps are adjustable so that each may be adjusted to compensate for any difference in the physical characteristics of the two persons.

In another preferred embodiment of the invention, the body portion of a fourth strap is threaded through one of the looped end straps and connected to its buckle to form four linked looped straps comprising two middle straps and two opposite end straps. In use, the two middle straps are positioned to contact the bottom surface of the relatively large object and the two opposite end straps are positioned and used as described above.

In another preferred embodiment of the invention, the body portion of each of two additional straps is threaded through the looped first strap and connected to its buckle to form four looped straps linked to the looped first strap. This embodiment of the invention is used to carry a relatively large object which is also relatively heavy and requires four persons to carry the relatively large and heavy object. In use, the five looped straps comprise a middle strap having opposite end portions with two looped end straps at one of the opposite end portions and two looped end straps at the other of the opposite end portions. In use, the middle strap is positioned so as to contact the bottom surface. The end straps are positioned as described above so as to have portions in contact with the bottom surface and other portions extending outwardly from the bottom surface. A first person will grasp a portion of a first end strap and lift upwardly to move portions thereof into contact with opposite portions of the relatively large opposite surfaces. The second, third and fourth persons will do the same with a portion of the second, third and fourth end straps. Each of the end straps is adjustable to compensate for any differences in the physical characteristics of the four persons. If the relatively large object is only heavy at one end thereof, four linked loop straps may be used with two of the linked looped straps at the heavy end.

In another preferred embodiment of the invention, the plurality of straps are arranged so that a single individual can carry one or more relatively large objects. In this embodiment at least one of the at least three looped straps is located so as to be adjacent to only portions of one of the relatively large opposite surfaces; at least a second one of the at least three looped straps is located so portions thereof are adjacent to spaced apart portions of the one of the relatively large opposite surfaces, at least a portion of the bottom surface, at least a portion of the other of the relatively large opposite side surfaces and at least a portion of one of the opposite side surfaces; and at least a third one of the at least three looped straps is located so that portions thereof are adjacent to spaced apart other portions of the one of the relatively large opposite surfaces, at least another portion of the bottom surface, at least another portion of the other of the relatively large opposite surfaces and at least another portion of the other of the opposite side surfaces.

BRIEF DESCRIPTION OF THE DRAWING

Illustrative and presently preferred embodiments of the invention are illustrated in the drawing in which:

FIG. 1 is a front elevational view of the apparatus of one preferred embodiment of the invention in position on a relatively large object;

FIG. 2 is a bottom plan view of FIG. 1;

FIG. 3 is a partial end elevational view from the left side of FIG. 1;

FIG. 4 is a pictorial view of two preferred embodiments of the invention;

FIG. 5 is a pictorial view of another preferred embodiment of the invention;

DETAILED DESCRIPTION OF THE INVENTION

Figure 6:
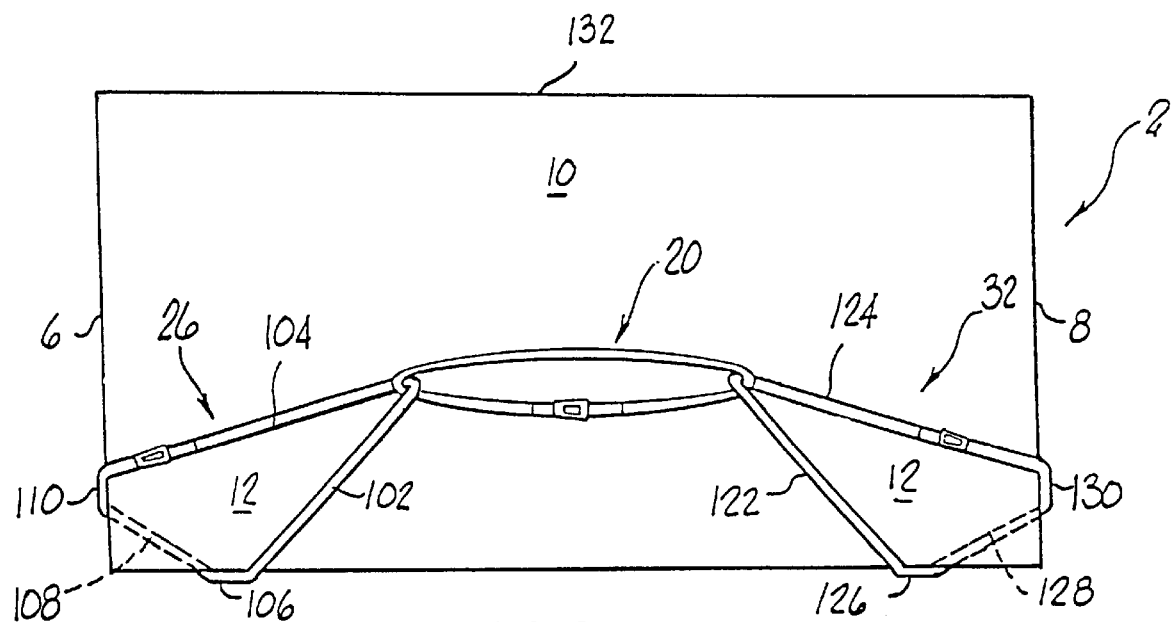
FIG. 6 is a front elevational view of another preferred embodiment of the invention.

In FIGS. 1–4, there is illustrated one preferred embodiment of the apparatus 2 of this invention. The apparatus 2 is used to carry a relatively large object such as a mattress or other large object, having a bottom surface 4, opposite side surfaces 6 and 8 and relatively large opposite surfaces 10 and 12.

The apparatus 2 comprises a first looped strap 20 comprising a body portion 22 having an end portion that has been connected to a buckle 24; a second looped strap 26 comprising a body portion 28 having an end portion that has been connected to a buckle 30 and a third looped strap 32 comprising a body portion 34 having an end portion that has been connected to a buckle 36. Prior to connecting the body portions 28 and 34 to the buckles 30 and 36, the end portions thereof are threaded through the first looped strap 20 so as to link the first, second and third looped straps 20, 26 and 32 together.

In use, the first looped strap 20 is positioned to contact the bottom surface 4. The second looped strap 26 is positioned so that portions 40 and 42 contact the bottom surface 4 and portions 44 and 46 extend outwardly from the bottom surface 4 (not shown). The third looped strap 32 is positioned so that portions 48 and 50 contact the bottom surface 4 and portions 52 and 54 extend outwardly from the bottom surface 4 (not shown). A first person (not shown) grasps a portion 56 of the second looped strap 26 and lifts the portion 56 upwardly, as viewed in FIG. 1, to move the portions 44 and 46 into contact with opposite portions of the relatively large opposite surfaces 10 and 12. A second person (not shown) grasps a portion 58 of the third looped strap 32 and lifts the portion 58 upwardly, as viewed in FIG. 1, to move the portions 52 and 54 into contact with opposite other portions of the relatively large opposite surfaces 10 and 12. Prior to lifting the relatively large object, the second and third looped straps 26 and 32 are each adjusted so that the length thereof is sufficient to compensate for any differences in the physical characteristics of the first and second persons.

In FIG. 5, there is illustrated another preferred embodiment of the invention. The apparatus further comprises a fourth looped strap 70 comprising a body portion 72 having an end portion that has been connected to a buckle 74. Prior to connecting the body portion 72 to the buckle 74, the end portion is threaded through the third looped strap 32 so as to link the fourth looped strap 70 to the third looped strap 32.

The apparatus of FIG. 5 is used in a manner similar to that illustrated in FIGS. 1–3. The first and third looped straps are positioned so as to contact the bottom surface 4. The second looped strap 26 is positioned and used in the same manner as described above. The fourth looped strap 70 is positioned and used in the same manner as described above in relation to the third looped strap 32.

Another preferred embodiment of the invention relates to additional straps which are illustrated in FIG. 4 in dashed lines. The apparatus further comprises a fourth looped strap 80 comprising a body portion 82 having an end portion connected to a buckle 84 and a fifth looped strap 86 having a body portion 88 having an end portion connected to a buckle 90. Prior to connecting the body portions 82 and 88 to the buckles 84 and 90, the end portions thereof are threaded through the first looped strap 20 so as to link the fourth and fifth looped straps 80 and 86 to the first looped strap 20. In use, the second and fourth looped straps 26 and 80 are located adjacent to each other and the third and fifth looped straps 32 and 86 are located adjacent to each other. The apparatus illustrated by the solid and dashed lines in FIG. 4 is used to carry a relatively large object that is also very heavy and requires four persons to carry it.

In use of the complete apparatus illustrated in FIG. 4 (not shown), the first looped strap 20 is positioned to contact the bottom surface 4. The second and fourth looped straps 26 and 28 are positioned similarly to the positioning of the second looped strap 26 described above. The third and fifth looped straps 32 and 86 are positioned similarly to the positioning of the third looped strap 32 described above. A first person (not shown) grasps the portion 56 of the second looped strap 26 and lifts upwardly to move the portions 44 and 46 into contact with portions of the relatively large opposite surfaces 10 and 12. A second person (not shown) grasps a portion of the fourth looped strap 80, similar to the portion 56, and lifts upwardly to move portions of the fourth looped strap 80, similar to the portions 44 and 46, into contact with other portions of the relatively large opposite surfaces 10 and 12 or to overlap portions of the portions 44 and 46. A third person (not shown) grasps the portion 58 of the third looped strap 32 and lifts upwardly to move the portions 52 and 54 into contact with other portions of the relatively large opposite surfaces 10 and 12. A fourth person (not shown) grasps a portion of the fifth looped strap 86, similar to the portion 58, and lifts upwardly to move portions of the fifth looped strap 86, similar to the portions 52 and 54, into contact with other portions of the relatively large opposite surfaces 10 and 12 or to overlap portions of the portions 52 and 54. Prior to lifting the relatively large object, the second, third, fourth and fifth looped straps 20, 26, 32, 80 and 86 are each adjusted so that the length thereof is sufficient to compensate for any differences in the physical characteristics of the first, second, third and fourth persons.

If the relatively heavy, relatively large object is heavy only at one end, for example the right end of FIG. 4, the looped strap 80 can be eliminated.

The straps used in forming the apparatus of this invention are of the type marketed by U.S.A. Products under the designation of Part No. 160096. The body portion is formed from one inch wide weather resistant polypropylene webbing and the buckle is mar proof. Preferably the straps are of the same length which, in the product described above, is nine feet. If desired, other straps can be color coded and come with directions for the assembly thereof. The use of color coding is particularly useful when the same two persons are using the linked looped straps. By placing each colored strap at an indicated location, there is no need to repeatedly adjust the straps.

Figure 7:
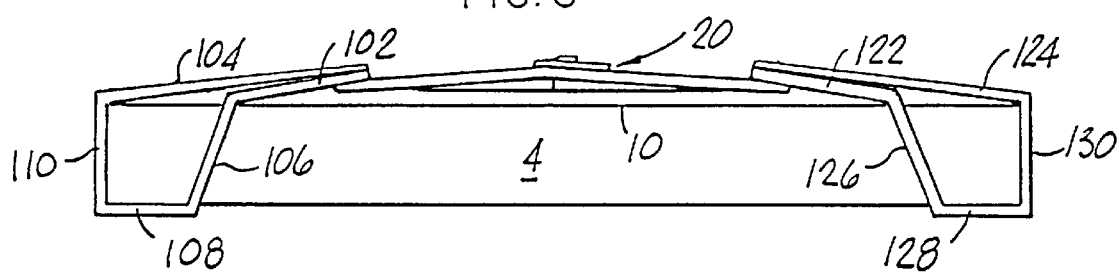
FIG. 7 is a bottom plan view of FIG. 6 for carrying one relatively large object.
Figure 8:
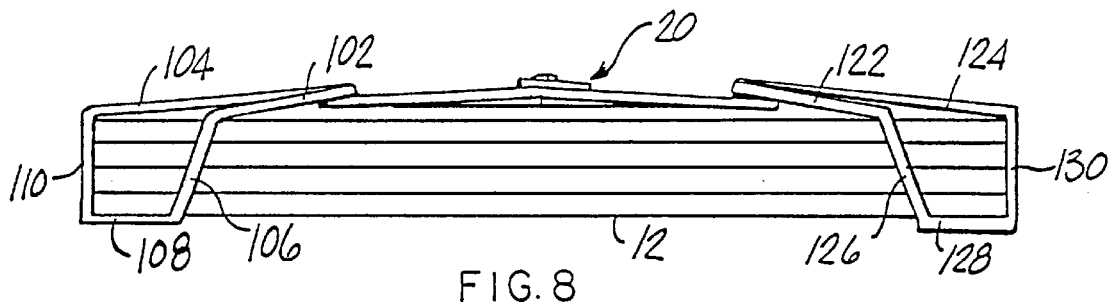
FIG. 8 is a bottom plan view of FIG. 6 for carrying a plurality of relatively large objects.

Another preferred embodiment of the invention is illustrated in FIGS. 6–8. In this embodiment of the invention, the parts corresponding to the embodiments described above have been given the same reference numerals. In this embodiment, the looped straps 20, 26 and 32 are arranged so that one or more relatively large objects may be readily carried by a single individual.

As illustrated in FIG. 6–8, all of the first looped strap 20 is located to be adjacent to only portions of the relatively large surface 10.

The second looped strap 26 is located so that portions 102 and 104 thereof are adjacent to portions of the relatively large surface 10. Another portion 106 of the second looped strap 26 is adjacent to a portion of the bottom surface 4 of the relatively large object or objects. Another portion 108 of the second looped strap 26 is adjacent to a portion of the other relatively large surface 12. Another portion 110 of the second looped strap 26 is adjacent to a portion of the opposite side surface 6.

The third looped strap 32 is located so that portions 122 and 124 thereof are adjacent to other portions of the relatively large surface 10. Another portion 126 of the third looped strap 32 is adjacent to another portion of the bottom surface 4 of the relatively large object or objects. Another portion 128 of the third looped strap 32 is adjacent to another portion of the other relatively large surface 12. Another portion 130 of the third looped strap 32 is adjacent to a portion of the opposite side surface 8.

The looped together first, second and third looped straps 20, 26 and 32 are used by one individual to carry a relatively large object or objects. In FIG. 7, there is illustrated an arrangement of the looped straps 20, 26 and 32, for one individual to carry a relatively large object, such as a mattress. In FIG. 8, there is illustrated an arrangement of the looped straps 20, 26 and 32 for one individual to carry a plurality of objects, such as sheets of four by eight foot plywood. In FIG. 8, there are illustrated four sheets but this is for illustration purposes only and the number and thicknesses of the sheets can vary.

In use, an individual would arrange the looped straps 20, 26 and 32 as indicated in FIGS. 6–8. The individual would then grasp a portion of the looped strap 20 with one hand and place the other hand against the top portion 132 of the relatively large object or objects and apply a force on the looped strap 20 to lift the relatively large object or objects and a force on the portion 132 to balance the relatively large object or objects.

It is contemplated that the inventive concepts herein described may be variously otherwise embodied and it is intended that the appended claims be constructed to include alternative embodiments of the invention except insofar as limited by the prior art.

What is claimed is:

1. Strap apparatus comprising a plurality of straps for use by an individual in carrying a relatively large object or objects having at least a bottom surface, opposite side surfaces and relatively large opposite surfaces comprising:

at least three looped straps;

each of said at least three looped straps being adjustable;

each of said at least three looped straps comprising an elongated body portion and a securing buckle for permitting adjustment of the length of said elongated body portion and for holding each of said at least three looped straps at a desired length;

at least one of said at least three looped straps being located so as to be adjacent to only portions of one of said relatively large opposite surfaces;

at least a second one of said at least three looped straps being located so that portions thereof are adjacent to spaced apart portions of said one of said relatively large opposite surfaces, at least a portion of said bottom surface, at least a portion of the other of said relatively large opposite side surfaces and at least a portion of one of said opposite side surfaces;

at least a third one of said at least three looped straps being located so that portions thereof are adjacent to spaced apart other portions of said one of said relatively large opposite surfaces, at least another portion of said bottom surface, at least another portion of said other of said relatively large opposite surfaces and at least another portion of the other of said opposite side surfaces; and at least two of said at least three looped straps being linked to another of said at least three looped straps by securing the elongated body portion of a first one of said at least three looped straps to said securing buckle to form a first looped strap; threading the elongated body portions of each of the second and third looped straps of said at least three looped straps through said first looped strap and securing said elongated body portions of said second and third looped straps to its associated buckle so that, when a force is applied thereto, any portion of one of said at least three looped straps will move into contact with any portion of another of said at least three looped straps.

2. Strap apparatus as in claim 1 wherein:

each of said looped straps consisting only of said elongated body portion and said securing buckle for permitting adjustment of the length of said elongated body portion and for holding said looped strap at a desired length.

3. Strap apparatus as in claim 2 wherein:

said elongated body portion and said buckle are formed from a non-marring material.

4. Strap apparatus as in claim 3 wherein:

all of said at least three looped straps having elongated body portions of substantially the same length.

5. Strap apparatus as in claim 4 wherein:

each of said plurality of straps is color coated for identification and interchangeability.

6. Strap apparatus as in claim 1 wherein:

each of said plurality of straps is color coated for identification and interchangeability.

7. Strap apparatus as in claim 6 wherein:

each of said looped straps consisting only of said elongated body portion and said securing buckle for permitting adjustment of the length of said elongated body portion and for holding said looped strap at a desired length.

8. Strap apparatus as in claim 7 wherein:

said elongated body portion and said buckle are formed from a non-marring material.

9. Method for carrying by an individual a relatively large object or objects having at least a bottom surface, opposite side surfaces and relatively large opposite surfaces comprising:

providing at least three elongated straps, each consisting only of an elongated body portion and a buckle;

connecting said elongated body portion of each of said at least three elongated straps to said buckle thereof to form at least three looped straps;

linking two of said at least three looped straps to the other of said at least three looped straps during said connecting operation so that, when a force is applied thereto, any portion of one of said at least three linked together looped straps will move into contact with any portion of another of said linked together looped straps;

placing at least one of said three linked looped straps to be adjacent only to portions of one of said relatively large opposite surfaces;

placing at least a second one of said at least three linked looped straps so that portions thereof are adjacent to spaced apart portions of said one of said relatively large opposite surfaces, at least a portion of said bottom surface, at least a portion of the other of said relatively large opposite surfaces and at least a portion of one of said opposite side surfaces;

placing at least a third one of said at least three linked looped straps so that portions thereof are adjacent to spaced apart other portions of said one of said relatively large opposite surfaces, at least another portion of said bottom surface, at least another portion of said other of said relatively large opposite surfaces and at least a portion of the other of said opposite side surfaces; and applying an upwardly directed force on said at least one of said three linked looped straps.

10. Method as in claim 9 and further comprising:

applying a balancing force to the upper portion of said one of said relatively large opposite surfaces.

* * * * *